US009354487B2

(12) United States Patent
Morimoto

(10) Patent No.: US 9,354,487 B2
(45) Date of Patent: May 31, 2016

(54) IMAGE-PICKUP APPARATUS

(75) Inventor: Yosuke Morimoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1460 days.

(21) Appl. No.: 12/027,028

(22) Filed: Feb. 6, 2008

(65) Prior Publication Data

US 2008/0198257 A1 Aug. 21, 2008

(30) Foreign Application Priority Data

Feb. 16, 2007 (JP) ................................. 2007-035843

(51) Int. Cl.
*H04N 5/232* (2006.01)
*G02B 7/36* (2006.01)
*G03B 13/00* (2006.01)

(52) U.S. Cl.
CPC ...................................... *G03B 13/00* (2013.01)

(58) Field of Classification Search
CPC ............ G02B 7/36; G02B 7/365; G02B 7/38; G02B 7/28; H04N 5/23212
USPC ................. 348/345, 348–351, 353, 354, 356; 396/79, 80, 121, 139
See application file for complete search history.

(56) References Cited

U.S. PATENT DOCUMENTS

| | | | |
|---|---|---|---|
| 5,757,429 A * | 5/1998 | Haruki ........................... | 348/354 |
| 7,209,175 B1 * | 4/2007 | Kurokawa et al. ............ | 348/345 |
| 7,602,435 B2 | 10/2009 | Ishii | |
| 2005/0031330 A1 * | 2/2005 | Nonaka et al. ................ | 396/104 |
| 2005/0052564 A1 | 3/2005 | Ishii | |
| 2005/0185086 A1 * | 8/2005 | Onozawa ....................... | 348/349 |

FOREIGN PATENT DOCUMENTS

| | | |
|---|---|---|
| CN | 1595219 A | 3/2005 |
| JP | 06-205264 A | 7/1994 |
| JP | 2003-241074 A | 8/2003 |
| JP | 2003-244519 A | 8/2003 |
| JP | 2005-121819 A | 5/2005 |

(Continued)

OTHER PUBLICATIONS

Jan. 8, 2010 Chinese Office Action, that issued in Chinese Patent Application No. 200810006166.9.

(Continued)

*Primary Examiner* — Mekonnen Dagnew
(74) *Attorney, Agent, or Firm* — Cowan, Liebowitz & Latman, P.C.

(57) ABSTRACT

An image-pickup apparatus includes an image-pickup element photoelectrically converting an object image, a light-receiving sensor outputting a signal in accordance with a phase difference between a pair of object images, and a controller performing first focus control of controlling drive of a focus adjusting member based on a focus evaluation signal representing a contrast state of a video signal produced with the image-pickup element and second focus control of controlling drive of the focus adjusting member based on the signal in accordance with the phase difference. The controller stops the second focus control or switches focus control from the second focus control to the first focus control in response to a predetermined change found in the focus evaluation signal during the second focus control. The apparatus is capable of achieving an in-focus state smoothly and accurately with a hybrid AF.

17 Claims, 11 Drawing Sheets

(56) References Cited

FOREIGN PATENT DOCUMENTS

JP    2006-301150  A    11/2006
JP    2006-301378  A    11/2006

OTHER PUBLICATIONS

May 6, 2011 Japanese Office Action, that issued in Japanese Patent Application No. 2007-035843.

Apr. 8, 2014 Japanese Office Action, that issued in Japanese Patent Application No. 2013-019396.

Mar. 13, 2012 Japanese Office Action, that issued in Japanese Patent Application No. 2007-035843.

Dec. 24, 2013 Japanese Office Action, that issued in Japanese Patent Application No. 2013-019396.

* cited by examiner

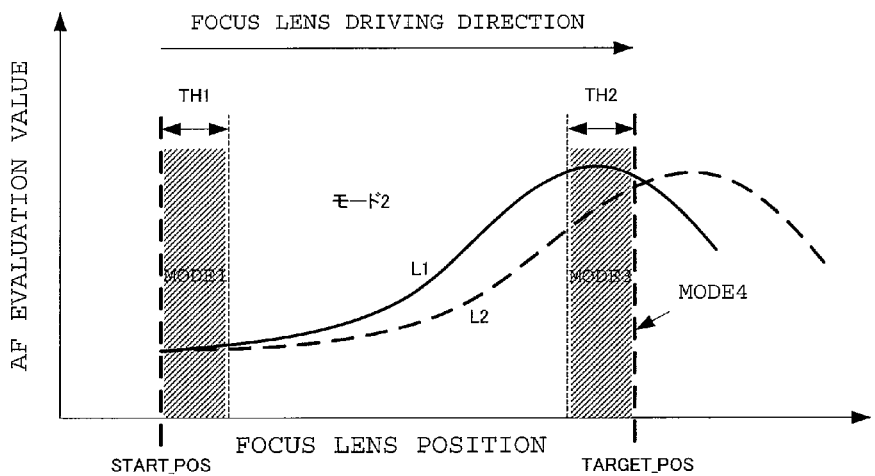

FIG. 5A

| MODE | LENS DRIVING STATE | CHANGES IN AF OPERATION | EFFECTS |
|---|---|---|---|
| MODE1 | IMMEDIATELY AFTER START OF LENS DRIVE | ·TRANSITION TO TV-AF IF REDUCTION IN AF EVALUATION VALUE IS EQUAL TO OR GREATER THAN THRESHOLD<br>·SET LENS DRIVING SPEED TO LOW SPEED | ·PREVENT NOTICEABLE DEFOCUSING IF LENS IS MOVED IN INCORRECT DIRECTION |
| MODE2 | INTERMEDIATE RANGE OF LENS DRIVE | ·TRANSITION TO TV-AF IF REDUCTION IN AF EVALUATION VALUE IS EQUAL TO OR GREATER THAN THRESHOLD<br>·SET LENS DRIVING SPEED TO HIGH SPEED | ·PREVENT NOTICEABLE OVERSHOOTING OF IN-FOCUS POSITION<br>·REDUCE FOCUSING TIME |
| MODE3 | IMMEDIATELY BEFORE END OF LENS DRIVE | ·RETURN LENS TO PEAK POSITION IF AF EVALUATION VALUE EXCEEDS PEAK AND STARTS TO REDUCE<br>·SET LENS DRIVING SPEED TO LOW SPEED | ·PREVENT OVERSHOOTING OF IN-FOCUS POSITION<br>·ENABLE RELIABLE DETECTION OF PEAK OF AF EVALUATION VALUE |
| MODE4 | END OF LENS DRIVE | ·PERFORM TV-AF CLIMBING DRIVE IN SAME DIRECTION IF AF EVALUATION VALUE INCREASWES | ·PREVENT TEMPORARY STOP BEFORE IN-FOCUS POSITION |

FIG. 5B

IMAGE-PICKUP APPARATUS

BACKGROUND OF THE INVENTION

The present invention relates to an image-pickup apparatus such as a video camera, and more particularly, to an image-pickup apparatus that performs so-called hybrid AF in which TV-AF and external or internal phase difference AF are used in combination.

For auto-focus (AF) control of video cameras or other image-pickup apparatuses, a TV-AF method is mainly used in which a video signal is produced by using an image-pickup element, an AF evaluation value signal is produced to represent the sharpness (contrast state) of the video signal, and the position of a focus lens where the AF evaluation value signal is at the highest is searched for.

AF methods include an external ranging method or external phase difference detection method in which a ranging sensor is provided independently of an image-pickup lens to detect a distance to an object, the in-focus position of a focus lens is calculated on the basis of the distance, and the focus lens is moved to the in-focus position.

In the external phase difference detection method, light flux from an object is split into two that are each received by a pair of light-receiving element arrays (line sensors). A difference between images formed on the pair of line sensors, that is, a phase difference, is detected and used to determine an object distance with a triangulation method. A focus lens is moved to a position where the lens is focused for that object distance.

The AF methods also include an internal phase difference detection method in which light flux passes through an exit pupil of the image-pickup lens and is then split into two which are each received by a pair of line sensors. A phase difference between two images on the pair of line sensors is detected, a defocus amount of the image-pickup lens is determined from the phase difference, and a focus lens is moved by an amount corresponding to the defocus amount.

Japanese Patent Laid-Open No. 5(1993)-64056 has proposed a hybrid AF method realized by combining those AF methods in order to take advantage of high accuracy of focusing in the TV-AF method and quick focusing in the phase difference detection method. The hybrid AF method proposed in Japanese Patent Laid-Open No. 5(1993)-64056 involves moving a focus lens to near an in-focus position by the phase difference detection method and then moving the focus lens to the in-focus position more accurately by the subsequent TV-AF method.

In the conventional hybrid AF, a focus lens is first moved to an in-focus position obtained with the phase difference detection method, and only when the AF evaluation value at that point is high, the TV-AF method follows to move the focus lens to an in-focus position obtained with the TV-AF method.

In moving the focus lens to the in-focus position in the phase difference detection method generally having lower focusing accuracy than the TV-AF method, however, the focus lens may be moved beyond (overshoot) the in-focus position obtained with the TV-AF method. Also, the movement of the focus lens may be stopped temporarily before the in-focus position obtained with the TV-AF method.

In the former case, the focus state of displayed video noticeably varies to reduce image quality. In the latter case, the temporary stop of the focus lens may increase the time taken to achieve focus in the TV-AF method, or may cause an unsmooth change in the focus state of displayed video until an in-focus state is obtained in the TV-AF method, thereby making a user feel anomalous.

In addition, especially when the external phase difference detection method is used, the view field of the ranging sensor is shifted from the view field (image-pickup area) in the TV-AF method for a certain object distance, that is, parallax is present. Thus, The external phase difference detection method and the TV-AF method may calculate the in-focus positions of the focus lens for objects different from each other. In such a case, the focus lens is moved to an incorrect position that is calculated as the in-focus position in the phase difference detection method, so that the resulting video is significantly out of focus.

BRIEF SUMMARY OF THE INVENTION

The present invention provides an image-pickup apparatus capable of achieving an in-focus state smoothly and accurately with the hybrid AF.

According to an aspect, the present invention provides an image-pickup apparatus including an image-pickup element photoelectrically converting an object image, a light-receiving sensor outputting a signal in accordance with a phase difference between a pair of object images, and a controller performing first focus control of controlling drive of a focus adjusting member based on a focus evaluation signal representing a contrast state of a video signal produced with the image-pickup element and second focus control of controlling drive of the focus adjusting member based on the signal in accordance with the phase difference. The controller stops the second focus control or switches focus control from the second focus control to the first focus control in response to a predetermined change found in the focus evaluation signal during the second focus control.

According to another aspect, the present invention provides a method of controlling an image-pickup apparatus including an image-pickup element photoelectrically converting an object image and a light-receiving sensor outputting a signal in accordance with a phase difference between a pair of object images. The method includes the steps of performing first focus control of controlling drive of a focus adjusting member based on a focus evaluation signal representing a contrast state of a video signal produced with the image-pickup element, performing second focus control of controlling drive of the focus adjusting member based on the signal in accordance with the phase difference, and stopping the second focus control or switching focus control from the second focus control to the first focus control in response to a predetermined change found in the focus evaluation signal during the second focus control.

Other aspects of the present invention will be apparent from the embodiments described below with reference to the drawings.

BRIEF DESCRIPTION OF THE DRAWINGS

FIG. 5A is a graph for explaining modes in the phase different AF of Embodiment 1.

FIG. 5B is a table for explaining the details and effects of the focus control for each mode in the phase difference AF of Embodiment 1.

DETAILED DESCRIPTION OF THE PREFERRED EMBODIMENTS

Exemplary embodiments of the present invention will be described below with reference to the accompanied drawings.

Embodiment 1

Figure 1:
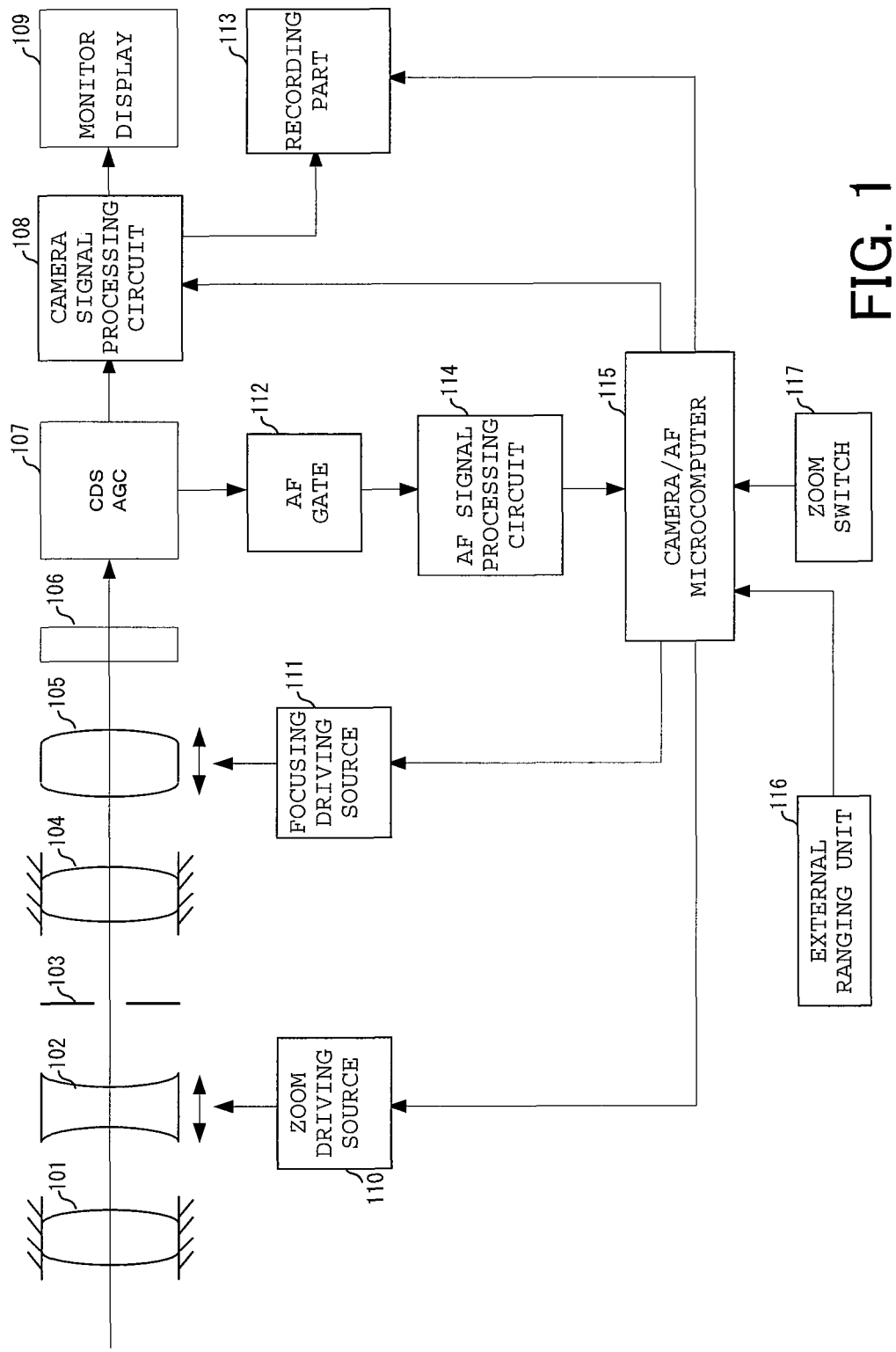
FIG. 1 is a block diagram showing the configuration of a video camera that is Embodiment 1 of the present invention.

FIG. 1 shows the configuration of a video camera serving as an image-pickup apparatus that is Embodiment 1 of the present invention. Although the video camera is described in Embodiment 1, the present invention is applicable to another image-pickup apparatus such as a digital still camera.

In FIG. 1, reference numeral 101 shows a first fixed lens, 102 a magnification-varying lens that is moved in the direction of an optical axis to provide magnification varying, and 103 an aperture stop. Reference numeral 104 shows a second fixed lens, and 105 a focus compensator lens (hereinafter referred to as a focus lens) which serves as a focus adjusting member having both of a function of correcting the movement of a focal plane associated with magnification varying and a function of focusing. The first fixed lens 101, the magnification-varying lens 102, the aperture stop 103, the second fixed lens 104, and the focus lens 105 constitute an image-pickup optical system.

Reference numeral 106 shows an image-pickup element that serves as a photoelectrical conversion element formed of a CCD sensor or a CMOS sensor, for example. Reference numeral 107 shows a CDS/AGC circuit that samples output from the image-pickup element 106 and adjusts the gain thereof.

Reference numeral 108 shows a camera signal processing circuit that performs various types of processing on an output signal from the CDS/AGC circuit 107 to produce a video signal. Reference numeral 109 shows a monitor display that is formed of an LCD or the like and displays the video signal from the camera signal processing circuit 108. Reference numeral 113 shows a recording part that records the video signal from the camera signal processing circuit 108 on a recording medium such as a magnetic tape, an optical disk, and a semiconductor memory.

Reference numeral 110 shows a zoom driving source for moving the magnification-varying lens 102. Reference numeral 111 shows a focusing driving source for moving the focus lens 105. Each of the zoom driving source 110 and the focusing driving source 111 is formed of an actuator such as a stepping motor, a DC motor, a vibration-type motor, and a voice coil motor.

Reference numeral 112 shows an AF gate that passes only the signal in an area of pixels for use in focus detection out of the signal of all the pixels output from the CDS/AGC circuit 107. Reference numeral 114 shows an AF signal processing circuit which extracts, from the signal passed through the AF gate 112, a high-frequency component, a luminance difference component (difference between the highest value and the lowest value of the luminance level of the signal passed through the AF gate 112) produced from the high-frequency component or the like to produce an AF evaluation value signal (focus evaluation signal). The AF evaluation value signal is output to a camera/AF microcomputer 115.

The AF evaluation value signal represents the sharpness (contrast state) of the video signal produced on the basis of the output signal from the image-pickup element 106. Since the sharpness changes depending on the focus state of the image-pickup optical system, the AF evaluation value signal thus represents the focus state of the image-pickup optical system.

Figure 9:
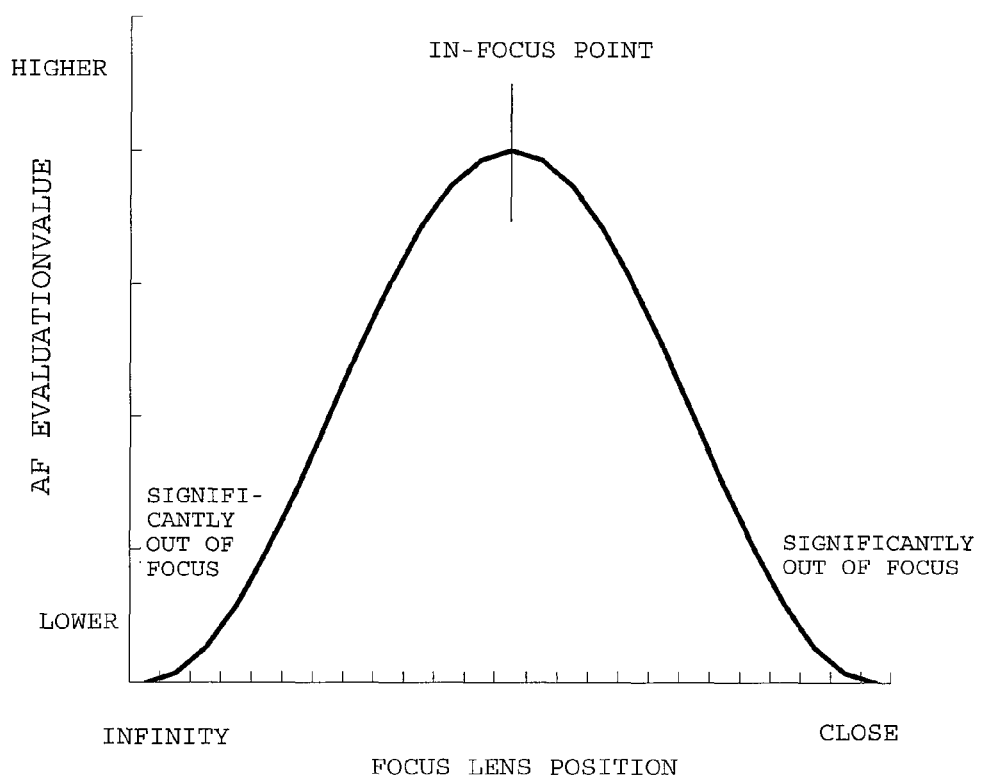
FIG. 9 is a graph for explaining the relationship between an AF evaluation value and the position of a focus lens.

FIG. 9 shows the relationship between the position of the focus lens 105 and the AF evaluation value signal. The AF evaluation value is low in an out-of-focus state in which the focus lens 105 is located away from an in-focus position (in-focus point). However, the AF evaluation value increases as the focus lens 105 approaches the in-focus position, and the peak (maximum) of the AF evaluation value corresponds to the in-focus position.

The camera/AF microcomputer (hereinafter referred to simply as the microcomputer) 115 serving as a controller governs control of the overall operation of the video camera and performs focus control for controlling the focusing driving source 111 to move the focus lens 105. The microcomputer 115 realizes the focus control by performing focus control in the TV-AF method (first focus control: hereinafter referred to as the TV-AF) and focus control in the external phase difference detection method (second focus control: hereinafter referred to as the phase difference AF).

Reference numeral 117 shows a zoom switch that is operated by a user to cause the microcomputer 115 to move the magnification-varying lens 102 through the zoom driving source 110. In this control, the microcomputer 115 moves the focus lens 105 through the focusing driving source 111 to minimize a change in image plane associated with the magnification varying based on zoom tracking data stored in an internal memory (not shown). Thus, magnification varying is realized with the in-focus state maintained.

Figure 10:
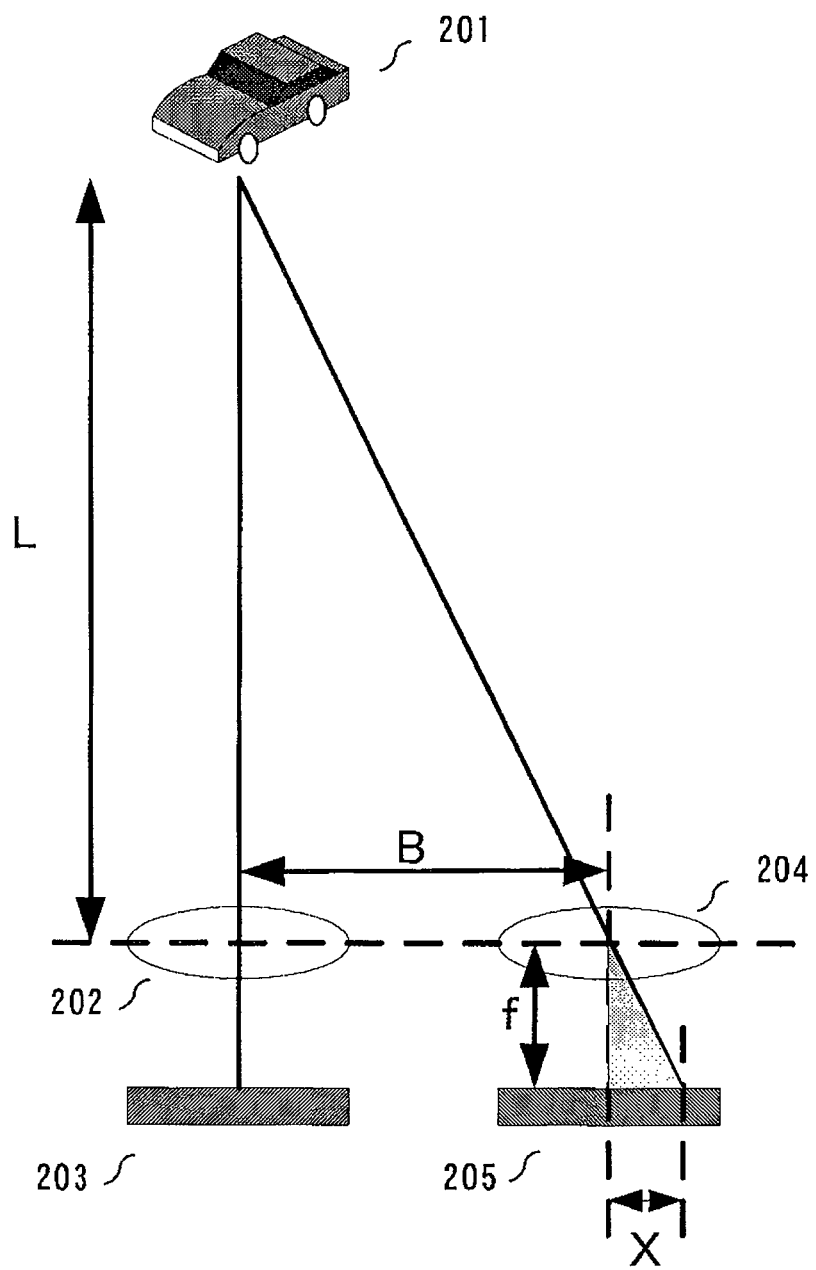
FIG. 10 is a schematic diagram for explaining ranging principles in Embodiment 1.
Figure 11:
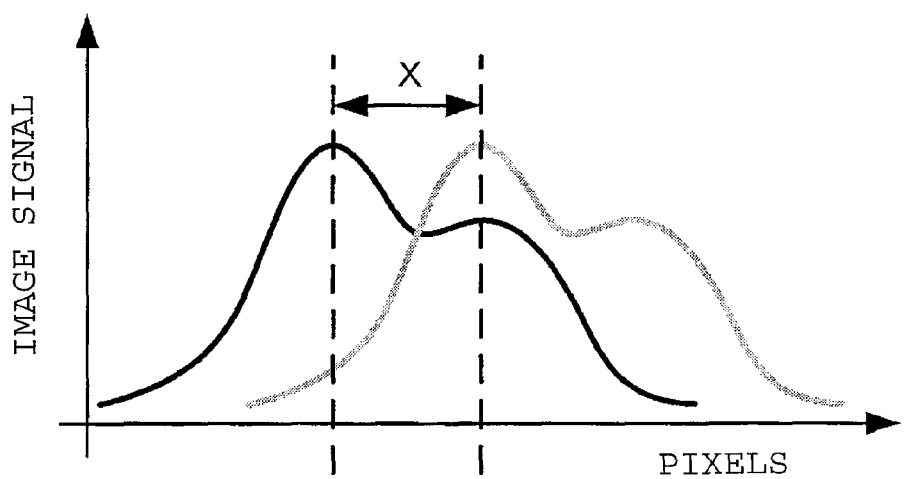
FIG. 11 is a graph for explaining principles of phase difference detection in Embodiment 1.

Reference numeral 116 shows an external ranging unit serving as a light-receiving sensor that detects a phase difference between a pair of object images to output a signal corresponding to the phase difference. The phase difference corresponds to the distance to an object. FIGS. 10 and 11 show the ranging principles in a phase difference passive method performed by using the external ranging unit 116. The external ranging unit 116 is provided independently of the image-pickup optical system. In other words, light flux from the object enters the external ranging unit 116 without passing through the image-pickup optical system.

In FIG. 10, reference numeral 201 shows the object, 202 a first image-forming lens, 203 a first light-receiving element array, 204 a second image-forming lens, and 205 a second light-receiving element array. Each of the first and second light-receiving element arrays 203 and 205 is formed of a plurality of light-receiving elements (pixels) in a line. The first and second light-receiving element arrays 203 and 205 are spaced from each other by a base length B.

Of light from the object 201, a light component passing through the first image-forming lens 202 forms an object image on the first light-receiving element array 203, and another light component passing through the second image-forming lens 204 forms another object image on the second light-receiving element array 205. In this manner, two object images in a pair are formed on the first and second light-receiving element arrays 203 and 205.

FIG. 11 shows an example of output signals (image signals) from the first and second light-receiving element arrays 203 and 205. Since the first and second light-receiving element arrays 203 and 205 are spaced by the base length B, the image signal from the first light-receiving element array 203 is shifted from the image signal from the second light-receiving element array 205 by the number X of pixels. Correlation between the two image signals is calculated with shifting the pixel, and the pixel shift amount achieving the highest correlation is determined to calculate the number X. The pixel shift amount X, the base length B, and focal lengths f of the image-forming lenses 202 and 204 can be used to determine a distance L to the object with a triangulation method from the following expression (1):

$$L = B \cdot f / X \quad (1)$$

The external ranging unit 116 outputs the pixel shift amount X (signal corresponding to the phase difference). The microcomputer 115 determines the object distance based on the pixel shift amount X.

The microcomputer 115 uses the determined object distance to calculate a position of the focus lens at which the object at that distance is brought into focus (the position is hereinafter referred to also as the phase-difference in-focus position). "To calculate" includes not only calculation with expressions but also reading of data on in-focus positions for object distances previously stored in memory, not shown.

Next, the AF control performed in the microcomputer 115 will be described with reference to FIGS. 2 to 7. The AF control is performed in accordance with a computer program stored in the microcomputer 115.

Figure 2:
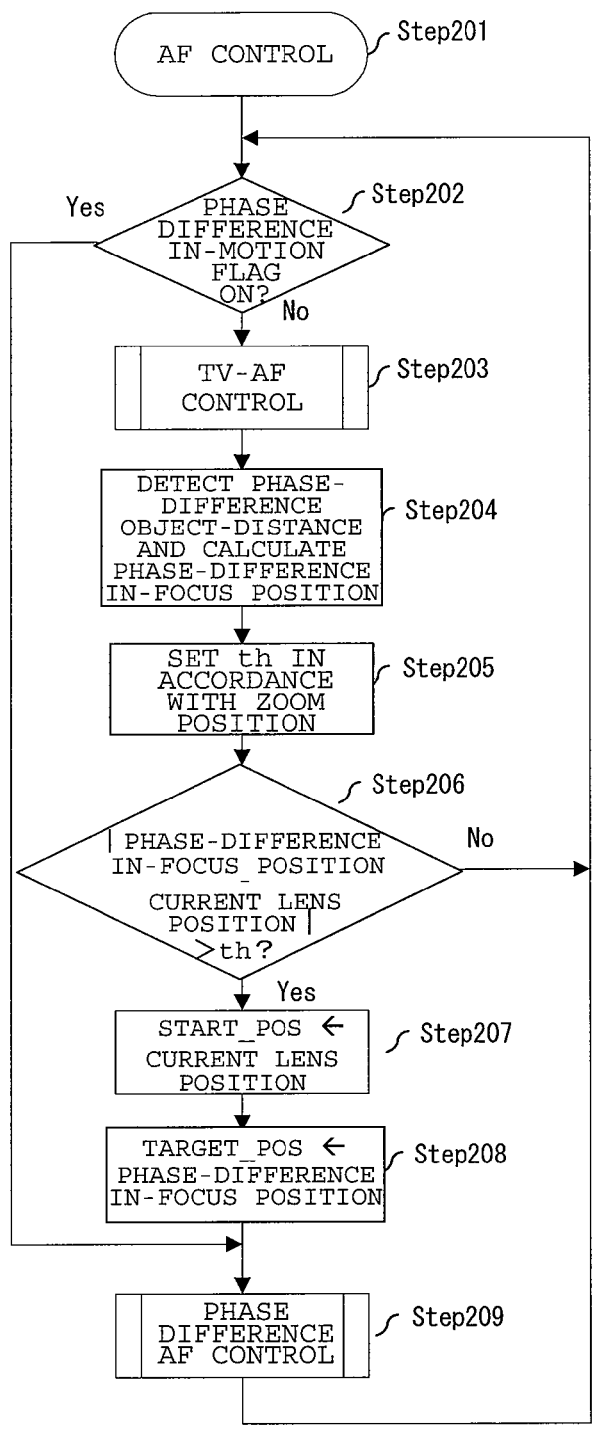
FIG. 2 is a flow chart showing AF control in Embodiment 1.

FIG. 2 shows the overall flow of the AF control. At step 201, the microcomputer 115 starts the AF control processing in response to power-on of the video camera.

At step 202, the microcomputer 115 checks whether or not a phase-difference in-motion flag, later described, is ON. If it is OFF, the control proceeds to step 203. If it is ON, the control proceeds to step 209 to continue the phase difference AF.

At step 203, the microcomputer 115 performs the TV-AF. The details of the TV-AF will be described later with reference to FIG. 3.

At step 204, the microcomputer 115 calculates the object distance based on the signal from the external ranging unit 116 and calculates the phase-difference in-focus position for that object distance.

At step 205, the microcomputer 115 sets a focus moving amount threshold (th) used in determining whether or not the focus lens 105 should be moved to the phase-difference in-focus position.

The focus moving amount threshold is preferably changed in accordance with the zoom position. This is because, since this embodiment uses the zoom image-pickup optical system of a rear-focus type is used as in Embodiment 1, the difference in the phase-difference in-focus position for different object distances varies depending on the focal length. For example, the difference between the phase-difference in-focus position for an object distance of 1 meter and that for an object distance of infinity increases as the focal length increases toward the telephoto side.

For example, on a telephoto side, a focus moving amount threshold is set which allows determination that the object distance is obviously changed from information provided in the phase difference AF in view of in-focus accuracy of the phase difference AF. In this case, if the same focus moving amount threshold is used on the wide-angle side, the determination that the object distance is changed is impossible unless the object distance is changed by an amount larger than the difference between one meter and infinity. As a result, the phase difference AF cannot be operated on the wide-angle side.

At step 206, the microcomputer 115 compares the difference between the phase-difference in-focus position obtained at step 204 and the current focus lens position with the focus moving amount threshold set at step 205. The current focus lens position can be detected, for example, by an encoder, not shown. If the difference is greater than the focus moving amount threshold, the control proceeds to step 207 in order to move the focus lens 105 to the phase-difference in-focus position. On the other hand, if the difference is smaller than the focus moving amount threshold, the control returns to step 202. Then, the processing at step 202 is performed and followed by the TV-AF.

At step 207, the microcomputer 115 stores the current focus lens position as data START_POS in the internal memory as a driving start position of the focus lens 105 with the phase difference AF.

Next, at step 208, the microcomputer 115 stores the phase-difference in-focus position as data TARGET_POS, and the control proceeds to step 209.

At step 209, the phase difference AF is performed. The details of the phase difference AF will be described later with reference to FIG. 4.

After step 209, the control returns to step 202.

Figure 3:
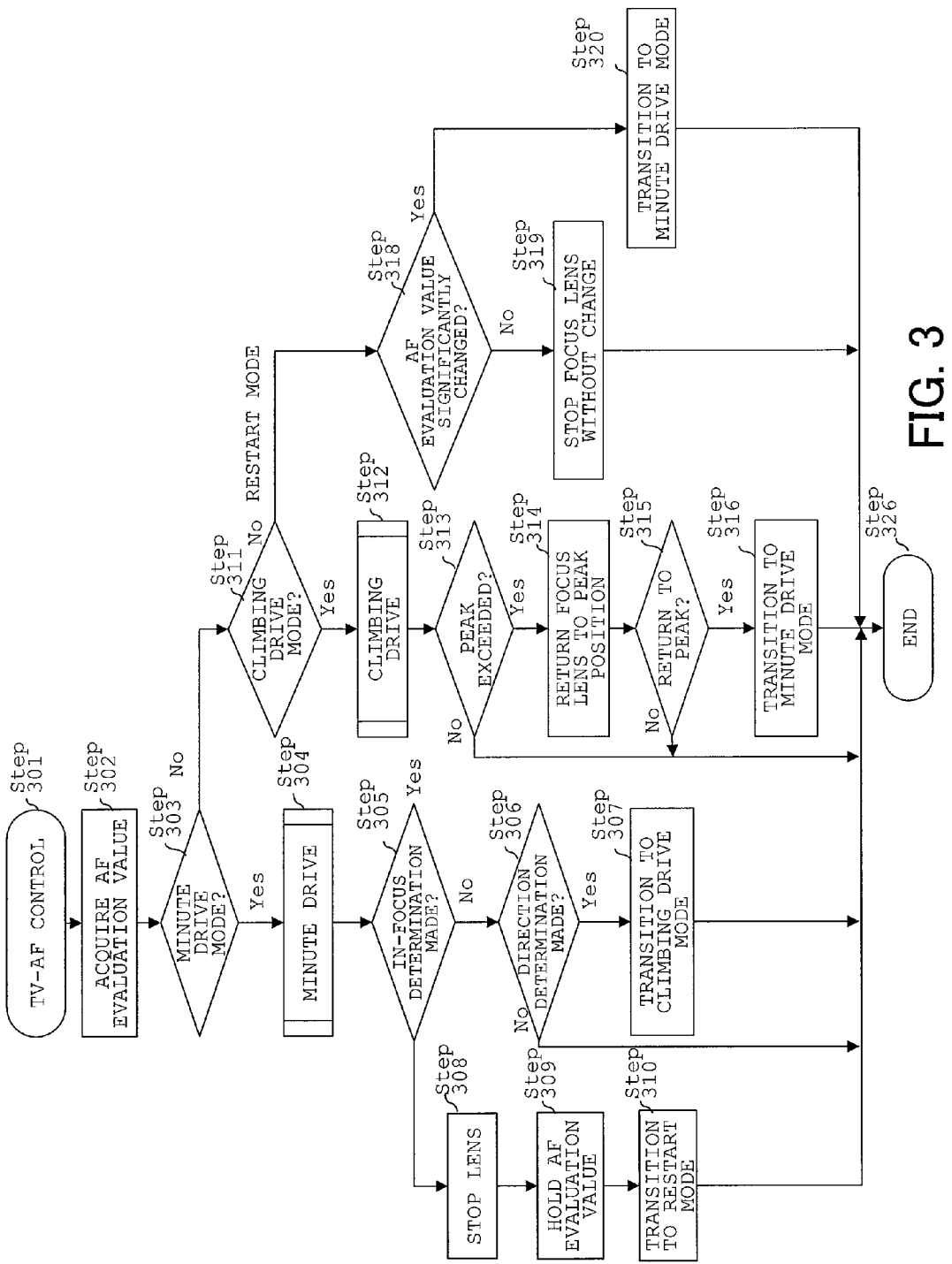
FIG. 3 is a flow chart showing TV-AF control in Embodiment 1.

Next, the details of the TV-AF performed at step 203 will be described with reference to FIG. 3.

At step 301, the microcomputer 115 starts the processing of the TV-AF.

At step 302, the microcomputer 115 acquires the AF evaluation value signal from the AF signal processing circuit 114.

At step 303, the microcomputer 115 determines whether or not the TV-AF is presently in a minute drive mode. If it is in the minute drive mode, the control proceeds to step 304, or to step 311 if not.

At step 304, the microcomputer 115 causes the focus lens 105 to perform minute drive operation. The minute drive operation allows determination whether or not an in-focus direction in which an in-focus position in the TV-AF (hereinafter referred to as a TV-AF in-focus position) is present is found and whether or not an in-focus state in the TV-AF is achieved. The minute drive operation will be described later with reference to FIG. 6.

At step 305, the microcomputer 115 determines whether or not the in-focus state has been determined. If the in-focus state has been determined, the control proceeds to step 308 to stop the drive of the focus lens 105, and then at step 309, the AF evaluation value at the in-focus position is held. Then, the control proceeds to step 310 for transition to a restart mode. On the other hand, if the in-focus state has not been determined, the control proceeds to step 306.

At step 306, the microcomputer 115 determines whether or not the in-focus direction has been determined. If the in-focus direction has been determined, the control proceeds to step 307 for transition to a climbing drive mode. If the in-focus direction has not been determined, the control proceeds to step 326 and then the operation in the minute drive mode is continued.

At step 311, the microcomputer 115 determines whether or not the TV-AF is presently in the climbing drive mode. If it is in the climbing drive mode, the control proceeds to 312, or to step 318 for transition to the restart mode if not.

At step 312, the microcomputer 115 performs climbing drive of the focus lens 105 at a predetermined speed. The climbing drive will be described later with reference to FIG. 7.

At step 313, the microcomputer 115 determines whether or not the peak of the AF evaluation value has been exceeded in the climbing drive mode. If it is determined that the peak has been exceeded, the control proceeds to step 314. It is determined that the peak has not been exceeded, the operation in the climbing drive mode is continued.

At step 314, the microcomputer 115 returns the focus lens 105 to the position (TV-AF in-focus position) at which the AF evaluation value is at the peak in the climbing drive mode.

At step 315, the microcomputer 115 determines whether or not the focus lens 105 has returned to the TV-AF in-focus position at which the AF evaluation value is at the peak. If it has returned to the TV-AF in-focus position, the control proceeds to step 316 for transition to the minute drive mode. If not, the operation of returning the focus lens 105 to the TV-AF in-focus position is continued in the climbing drive mode.

When it is determined that the TV-AF is not in the climbing drive mode at step 311, the microcomputer 115 proceeds to the restart mode from step 318.

At step 318, the microcomputer 115 compares the AF evaluation value held at step 309 with the latest AF evaluation value to determine whether or not the variation in the AF evaluation value is greater than a predetermined threshold. If the variation in the AF evaluation value is larger than the threshold, the control proceeds to step 320 for transition to the minute drive mode. If the variation in the AF evaluation value is smaller than the threshold, the control proceeds to step 319 to stop the focus lens 105 without any change.

Figure 6:
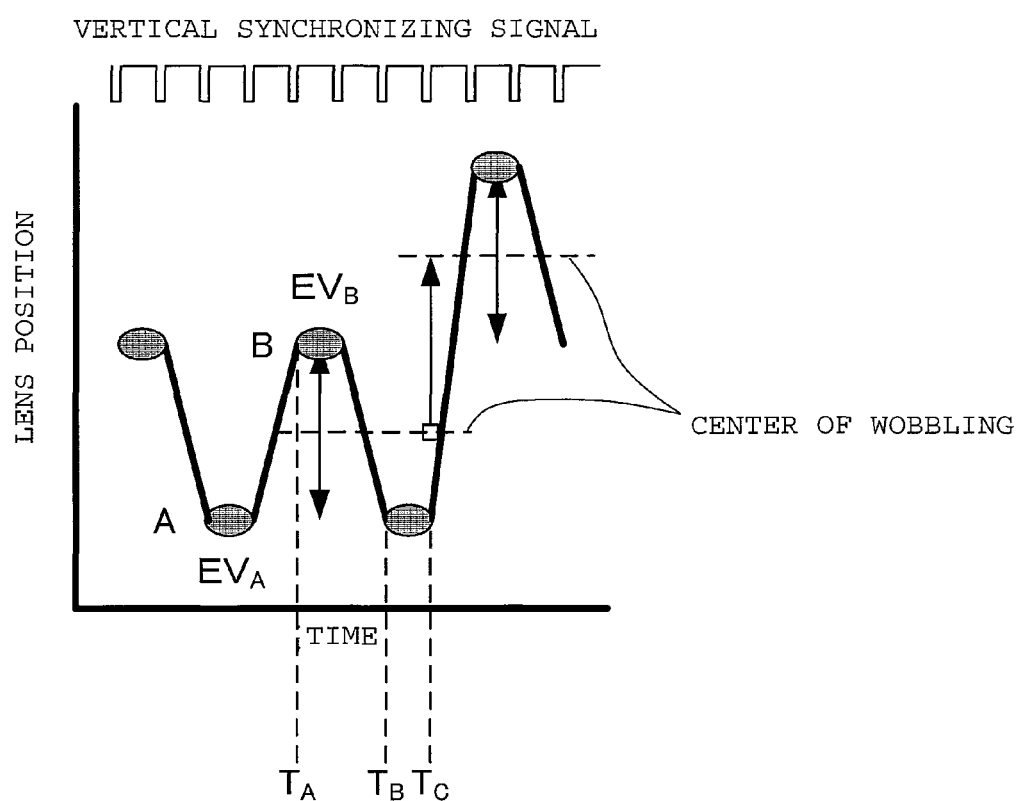
FIG. 6 is a graph for explaining minute drive operation in the TV-AF of Embodiment 1.

Next, the operation of the minute drive mode in the TV-AF will be described with reference to FIG. 6. FIG. 6 shows the relationship between the movement of the focus lens 105 and the change in the AF evaluation value in the minute drive operation. The horizontal axis represents time, while the vertical axis represents the focus lens position. A vertical synchronizing signal for the video signal is shown at the top of FIG. 6.

An AF evaluation value signal $EV_A$ for electrical charges (shown by a diagonally shaded ellipse) accumulated in the image-pickup element 106 during a period A is taken at a time $T_A$, and an AF evaluation value signal $EV_B$ for electrical charges accumulated in the image-pickup element 106 during a period B is taken at a time $T_B$. At a time $T_C$, the AF evaluation values $EV_A$ and $EV_B$ are compared. If $EV_B > EV_A$, the driving (wobbling) center of the minute drive is moved, so that a driving amplitude of the focus lens 105 is equal to the sum of a wobbling amplitude and a moving amplitude of the driving center. On the other hand, if $EV_A > EV_B$, the driving center is not moved, so that a driving amplitude of the focus lens 105 is equal to the wobbling amplitude. In this manner, the minute drive operation involves detecting the direction in which the AF evaluation value increases and searching for the focus lens position (peak position) at which the AF evaluation value is at the highest while the focus lens 105 is moved.

When the wobbling center is moved in the same direction a predetermined number of times successively, that direction is determined as the in-focus direction. The determination result is used in the determination whether or not transition is made to the climbing drive mode at step 306 in FIG. 3.

Figure 7:
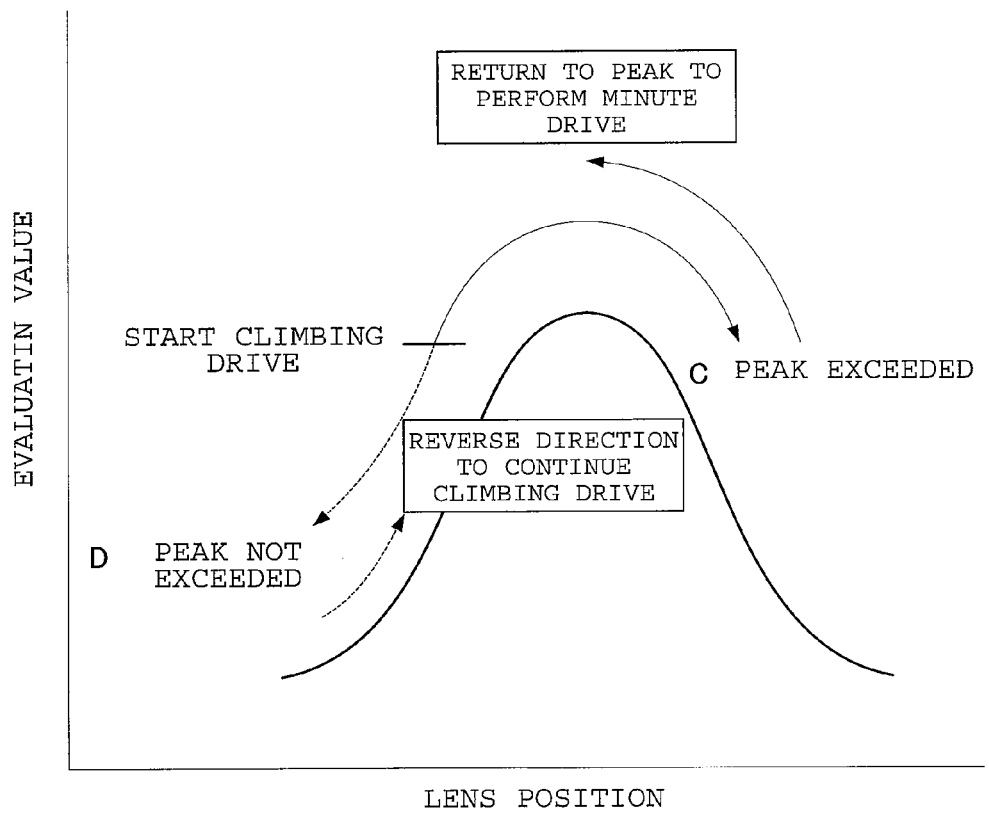
FIG. 7 is a graph for explaining climbing drive operation in the TV-AF of Embodiment 1.

Next, the operation of the climbing drive mode in the TV-AF will be described with reference to FIG. 7. In the climbing drive operation, the focus lens 105 is driven at a high speed to detect a peak position corresponding to the peak of the AF evaluation value obtained during the high-speed driving or a position near the peak position. FIG. 7 shows the relationship between the movement of the focus lens 105 and the change in the AF evaluation value in the climbing drive operation.

In a movement C, the AF evaluation value reduces after the peak and thus the presence of the peak position (TV-AF in-focus position) can be found, so that the climbing drive operation is ended and switched to the minute drive operation. On the other hand, in a movement D, since the AF evaluation value simply reduces without a peak, it can be determined that the focus lens 105 is driven in an incorrect direction. In this case, the driving direction is reversed and then the climbing drive operation is continued.

Figure 4:
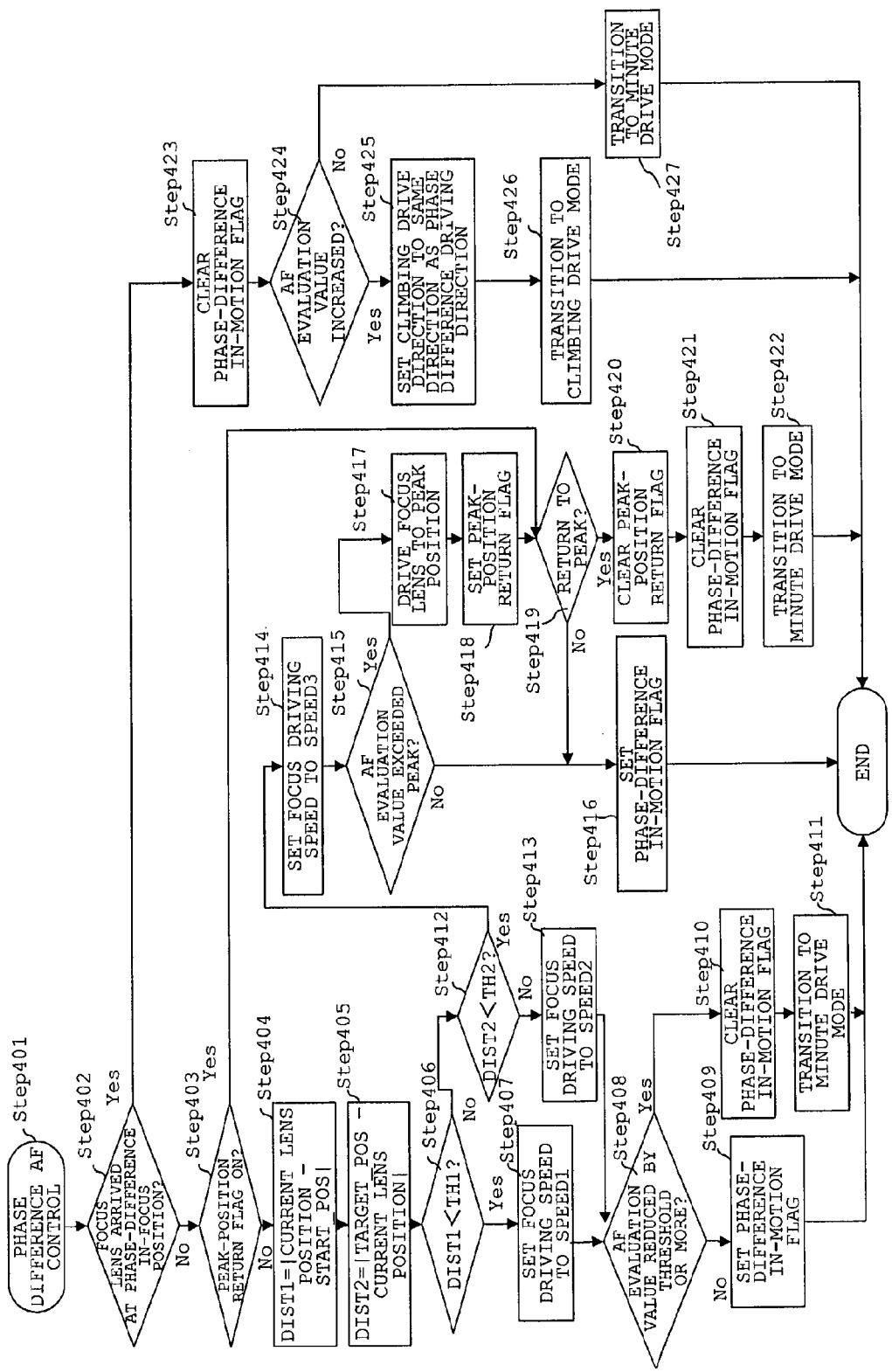
FIG. 4 is a flow chart showing phase different AF control in Embodiment 1.

Next, the phase difference AF processing performed at step 209 of FIG. 2 will be described with reference to FIGS. 4, 5A, and 5B.

FIG. 5A shows a plurality of divided stages (hereinafter referred to as modes) from start to end of the driving period of the focus lens 105 toward the phase-difference in-focus position in the phase difference AF. In this embodiment, the microcomputer 115 divides the driving period from start to end into four modes (modes 1 to 4). However, the number of divided modes is not limited thereto.

In FIG. 5A, the horizontal axis represents the focus lens position. START_POS indicates the current focus lens position stored at step 207 of FIG. 2, that is, the focus driving start position. TARGET_POS indicates the phase-difference in-focus position stored at step 208 of FIG. 2, that is, the driving end position.

In the phase difference AF, the focus lens 105 is driven from left to right in FIG. 5A from START_POS to TARGET_POS.

The vertical axis represents the AF evaluation value. A solid line L1 shows an example of the AF evaluation value for an object that the TV-AF in-focus position is located before the phase-difference in-focus position (driving end position) TARGET_POS. A broken line L2 shows an example of the AF evaluation value for an object that the TV-AF in-focus position is located after the phase-difference in-focus position (driving end position) TARGET_POS.

As shown in FIG. 5A, when the focus lens 105 is located within a range (threshold) TH1 after the driving start position START_POS, focus control appropriate for the state of the focus lens 105 immediately after the driving start is selected for the mode 1 as a driving start stage.

On the other hand, when the focus lens 105 is located within a range (threshold) TH2 having the driving end position TARGET_POS at its end, focus control appropriate for the state of the focus lens 105 immediately before the driving end is selected for the mode 3 as a stage immediately before the driving end.

In an intermediate range (intermediate stage) between the mode 1 and mode 3, focus control appropriate for the intermediate state is selected for the mode 2. At the driving end, focus control appropriate for the state at the driving end is selected for the mode 4 as a driving end stage.

In this embodiment, the period from the driving start to the driving end of the focus lens 105 (when the focus lens 105 arrives at the driving end position TARGET_POS) is represented as "during focus control with the phase difference AF" (during the second focus control).

In the modes 1, 2, and 4, the microcomputer 115 determines the mode (or switches between the modes) based on the current position of the focus lens 105. On the other hand, in the mode 3, that is, in the range TH2, the mode is desirably determined on the basis of the focal depth of the image-pickup optical system since the focus lens 105 is located near the phase-difference in-focus position.

Next, the details of the focus control in each of the modes will be described with reference to FIG. 5B as well.

The mode 1 corresponds to the state immediately after the driving start of the focus lens 105. In this state, the focus lens 105 may be driven to an incorrect phase-difference in-focus position TARGET_POS since the view field of the external ranging unit 116 is shifted from the view field in the TV-AF (image-pickup element 106), that is, parallax is present.

Thus, in the mode 1, if a reduction in the AF evaluation value is greater than a predetermined threshold during the focus control with the phase difference AF (during the drive of the focus lens 105 toward TARGET_POS), it is determined that the driving direction is incorrect. Then, the drive of the focus lens 105 toward TARGET_POS is stopped and the focus control is switched to the TV-AF. This can prevent the focus lens 105 from continuing to move in a direction in which an object to be brought into focus in the TV-AF is increasingly out of focus. In addition, in the mode 1, the driving speed of the focus lens 105 toward TARGET_POS is set to a low speed SPEED1 (first speed). This can avoid that the defocusing amount is suddenly increased and the defocusing becomes noticeable if the focus lens 105 is driven in an incorrect direction.

The mode 2 corresponds to the intermediate state between the driving start and the driving end of the focus lens 105. In this state, the focus lens 105 is driven at a higher speed SPEED2 (second speed) than the low speed SPEED1 in the mode 1 in order to reduce the time taken for movement to TARGET_POS, that is, the focusing time. If the TV-AF in-focus position is present in the intermediate state, the focus lens 105 driven in the phase difference AF is preferably prevented from being moved beyond (overshooting) the TV-AF in-focus position and causing thereby noticeable defocusing. For this reason, as in the mode 1, when a reduction in the AF evaluation value is greater than a predetermined threshold, the driving toward TARGET_POS is stopped and the focus control is switched to the TV-AF. The threshold in the mode 2 may or may not be identical to the threshold in the mode 1.

The mode 3 corresponds to the state immediately before the driving end of the focus lens 105. In this state, the TV-AF in-focus position obtained from the AV evaluation value L1 in FIG. 5A is likely to be present, and it is necessary to reliably prevent the focus lens 105 driven in the phase difference AF from overshooting the TV-AF in-focus position. Thus, in the mode 3, when the AF evaluation value exceeds the peak and then starts to reduce, the drive of the focus lens 105 toward TARGET_POS is stopped. The focus lens 105 is then driven to return to the peak position as in the climbing drive mode in the TV-AF. At this time, the driving direction of the focus lens 105 is reversed.

In this case, it is possible that the drive of the focus lens 105 toward TARGET_POS is stopped and the drive mode is switched to the climbing drive mode in the TV-AF and then the focus lens 105 is driven to the peak position.

In the mode 3, the driving speed of the focus lens 105 is set to a lower speed SPEED3 (third speed) than the high speed SPEED2. This can detect the peak position of the AF evaluation value reliably and return the focus lens 105 to the peak position accurately. The low speed SPEED3 may or may not be identical to the abovementioned low speed SPEED1.

The mode 4 corresponds to the driving end state of the focus lens 105. In this state, it is necessary to avoid a phenomenon in which the focus lens 105 is temporarily stopped before the TV-AF in-focus position for an object with which the AF evaluation value L2 in FIG. 5A is detected. Thus, in the mode 4, if the AF evaluation value is increased from the mode 3 to the mode 4, the TV-AF in-focus position is considered to be present beyond TARGET_POS. The climbing drive mode in the TV-AF is entered to perform the TV-AF by setting the climbing drive direction to the same direction as the driving direction of the focus lens 105 in the phase difference AF. This achieves seamless switching from the phase difference AF to the TV-AF (without any temporary stop of the focus lens 105).

The phase difference AF explained above will be described with reference to FIG. 4.

At step 401, the microcomputer 115 starts the processing of the phase difference AF.

At step 402, the microcomputer 115 determines whether or not the focus lens 105 has arrived at the phase-difference in-focus position. If it has arrived at the in-focus position, the control proceeds to step 423 for transition to the mode 4. The processing in this case will be described later. If it has not arrived at the in-focus position, the control proceeds to step 403.

At step 403, the microcomputer 115 determines whether or not a peak-position return flag is ON to indicate that the focus lens 105 is being driven to return to the peak position of the AF evaluation value in the mode 3. If it is ON, the control proceeds to step 419. The processing in this case will be described later. If the flag is OFF, the control proceeds to step 404.

At step 404, the microcomputer 115 determines a difference DIST1 between the current focus lens position and the driving start position START_POS.

Next, at step 405, the microcomputer 115 determines a difference DIST2 between the current focus lens position and the driving end position TARGET_POS.

At step 406, the microcomputer 115 determines whether or not the difference DIST1 is smaller than the threshold TH1. If it is smaller, it is determined that the processing is being performed in the mode 1, that is, in the state immediately after the start of the focus lens driving, and then the control proceeds to step 407.

At step 407, the microcomputer 115 sets the low speed SPEED1 that is the driving speed of the focus lens 105 in the mode 1.

At step 408, the microcomputer 115 determines whether or not a reduction in the AF evaluation value is equal to or greater than the predetermined threshold. If it is smaller than the predetermined threshold, the microcomputer 115 sets a phase-difference in-motion flag indicating that the focus control with the phase difference AF is being performed, and then the processing is ended.

On the other hand, if the reduction is equal to or greater than the predetermined threshold, it is determined that the driving direction is incorrect. In this case, the microcomputer 115 clears (turns to OFF) the phase-difference in-motion flag in order to stop the phase difference AF and switch the focus control to the TV-AF. The microcomputer 115 switches the drive mode to the minute drive mode in the TV-AF and then ends the processing. Alternatively, it is possible to switch the drive mode to the climbing drive mode instead of the minute drive mode and set the climbing drive direction to the opposite direction to the driving direction in the phase difference AF.

If the difference DIST1 is larger than the threshold TH1 at step 406, the control proceeds to step 412 and the microcomputer 115 determines whether or not the difference DIST2 is smaller than the threshold TH2. If it is larger, it is determined that the processing is being performed in the mode 2, and the control proceeds to step 413.

At step 413, the microcomputer 115 sets the high speed SPEED2 that is the driving speed of the focus lens 105 in the mode 2. As described above, the setting of the high speed SPEED2 can reduce the time taken for the driving to the phase-difference in-focus position. Since the processing in the mode 2 except for the setting of the driving speed is the same as that in the mode 1, the control proceeds to step 408 to perform the subsequent processing.

On the other hand, if the difference DIST2 is smaller than the threshold TH2 at step 412, the microcomputer 115 proceeds to step 414 for transition to the mode 3.

At step 414, the microcomputer 115 sets the low speed SPEED3 as the driving speed of the focus lens 105 in the mode 3.

Next, at step 415, the microcomputer 115 determines whether or not the AF evaluation value has exceeded the peak value and then starts to reduce. If it has not exceeded the peak value, the control proceeds to step 416 to set the phase-difference in-motion flag ON. Then, the processing is ended.

On the other hand, if it is determined that the AF evaluation value has exceeded the peak value, the focus lens 105 is driven to return to the peak position at step 417 in order to avoid defocusing caused by overshooting the TV-AF in-focus position.

At step 418, the peak-position return flag is set ON.

Next, at step 419, the microcomputer 115 determines whether or not the focus lens 105 has returned to the peak position. If it has not returned thereto, the control proceeds to step 416 where the phase-difference in-motion flag is set ON. Then, the processing is ended.

On the other hand, if it is determined that the focus lens 105 has returned to the peak position, the control proceeds to step 420 to clear the peak-position return flag. Then, at step 421, the phase-difference in-motion flag is cleared.

At step 422, the microcomputer 115 switches to the minute drive mode in the TV-AF and the processing is ended.

If it is determined that the focus lens 105 arrives at the phase-difference in-focus position at step 402 described above, the control proceeds to step 423 for transition to the mode 4, and the phase-difference in-motion flag is cleared.

At step 424, the microcomputer 115 determines whether or not the AF evaluation value is being increased. If it is not being increased, the control proceeds to step 427 to enter the minute drive mode in the TV-AF. Then, the processing is ended.

On the other hand, if the AF evaluation value is being increased, it is considered that the TV-AF in-focus position is present ahead, and the control proceeds to step 425 to set the climbing drive direction to the same direction as the driving direction in the phase difference AF. Next, at step 426, the microcomputer 115 switches to the climbing drive mode in the TV-AF in the set climbing drive direction. Then, the processing is ended.

The above description is made in the case where the mode switching in the phase difference AF is performed on the basis of the focus lens position or the focal depth of the image-pickup optical system. However, the mode switching may be performed on the basis of the driving time period of the focus lens 105, for example by defining the mode 1 as a period from the driving start time to 100 ms.

As described above, in Embodiment 1, if the predetermined change is found in the AF evaluation value during the driving of the focus lens 105 toward the phase-difference in-focus position in the phase difference AF, the phase difference AF is stopped or the focus control is switched to TV-AF. This can avoid that the position of the focus lens 105 driven in the phase difference AF overshoots the TV-AF in-focus position and that any temporary stop of the focus lens 105 before the TV-AF in-focus position occurs. It is also possible to prevent defocusing due to the driving of the focus lens 105 toward an incorrect phase-difference in-focus position. This can smoothly and accurately achieve an in-focus state with the hybrid AF to improve the quality in the AF of the video camera.

Further, in Embodiment 1, the driving period of the focus lens 105 from start to end is divided into the plurality of modes (stages), the different predetermined changes in the AF evaluation value are used in the different modes, and the driving speed of the focus lens is switched for each of the modes. As a result, the focus control can be performed appropriately for each state such as the state immediately after the driving start and the state near the driving end.

Embodiment 2

Figure 8:
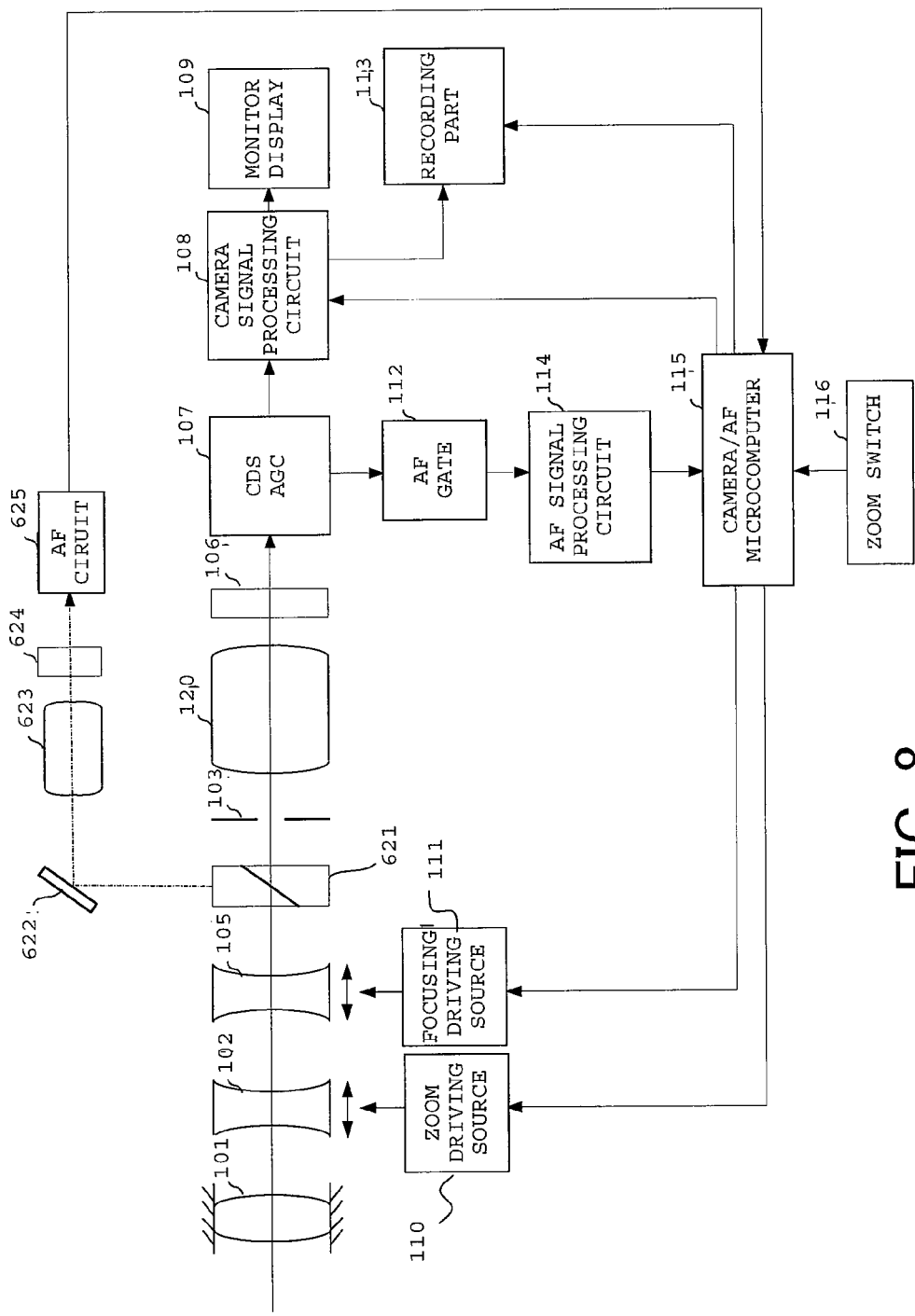
FIG. 8 is a block diagram showing the configuration of a video camera that is Embodiment 2 of the present invention.

FIG. 8 shows the configuration of a video camera which is Embodiment 2 of the present invention.

In Embodiment 2, components identical to those in Embodiment 1 are designated with the same reference numerals as those in Embodiment 1 and description thereof is omitted. While the external phase difference detection method with the external ranging unit 116 is employed as the second focus control in Embodiment 1, a TTL internal phase difference detection method is used in Embodiment 2.

In FIG. 8, reference numeral 621 shows a half prism serving as a light-splitting element that reflects part of light flux passing through the image-pickup optical system. In Embodiment 2, since an aperture stop 103 is always operated in open and close directions during moving image pickup, the half prism 621 is placed closer to an object side than the aperture stop 103.

Reference numeral 622 shows a sub-mirror that reflects the light flux reflected by the half prism 621. Reference numeral 623 shows an image-forming lens that receives the light flux from the sub-mirror 622 and forms a pair of object images for phase difference AF therefrom.

Reference numeral 624 shows a focus detection sensor serving as a light-receiving sensor that receives the paired object images to output a signal in accordance with a phase difference between the object images. Reference numeral 625 shows an AF circuit that processes the output signal from the focus detection sensor 624.

A microcomputer 115 detects a defocus amount (including a defocus direction) of the image-pickup optical system based on the signal in accordance with the phase difference input thereto from the focus detection sensor 624 through the AF circuit 625. The microcomputer 115 calculates a driving amount of the focus lens 105 to achieve an in-focus state, that is, a phase-difference in-focus position, based on the defocus amount.

In Embodiment 2, the defocus amount (including the defocus direction) is provided instead of the object distance at step 204 in FIG. 2 described in Embodiment 1, thereby allowing the use of the AF control algorithm described in Embodiment 1.

Specifically, at step 204 in the flow chart of FIG. 2, the microcomputer 115 may obtain the defocus amount of the image-pickup optical system and calculate the phase-difference in-focus position from the defocus amount.

In this manner, when the internal phase difference detection method is used, the phase difference AF may be stopped or switched to the TV-AF if the predetermined change is found in the AF evaluation value during the driving of the focus lens 105 toward the phase-difference in-focus position. This can provide similar effects to those in Embodiment 1.

As described above, according to each of Embodiments 1 and 2, when the predetermined change in the focus evaluation value (for example, the predetermined reduction, the predetermined increase, or the exceeding of the peak value) is found during the focus control with the phase difference detection method, the focus control is stopped or switched to the focus control in the TV-AF method in response to the change. This can prevent overshooting in the focus control with the phase difference detection method, any temporary stop before the in-focus position, and focus control toward an incorrect in-focus position. Therefore, smooth and accurate focus control can be performed with the hybrid AF.

Furthermore, the present invention is not limited to these preferred embodiments and various variations and modifications may be made without departing from the scope of the present invention.

This application claims foreign priority benefits based on Japanese Patent Application No. 2007-035843, filed on Feb. 16, 2007, which is hereby incorporated by reference herein in its entirety as if fully set forth herein.

What is claimed is:

1. An image-pickup apparatus comprising:
   an image-pickup element photoelectrically converting an object image;
   a light-receiving sensor outputting a signal in accordance with a phase difference between a pair of object images; and
   a controller performing first focus control of controlling drive of a focus adjusting member based on a sharpness signal representing a contrast state of a video signal produced with the image-pickup element and second focus control of controlling drive of the focus adjusting member based on the signal in accordance with the phase difference,
   wherein the controller stops the second focus control or switches focus control from the second focus control to the first focus control in response to a predetermined change found in the sharpness signal during the second focus control.

2. The image-pickup apparatus according to claim 1, wherein the controller divides a driving period of the focus adjusting member from start to end in the second focus control into a plurality of stages and varies the predetermined change depending on the stages.

3. The image-pickup apparatus according to claim 2, wherein the controller switches the predetermined change from a reduction in the sharpness signal, to a reduction in the sharpness signal after exceeding a peak value thereof, and then to an increase in the evaluation sharpness signal, from a driving start stage to a driving end stage of the focus adjusting member.

4. The image-pickup apparatus according to claim 3, wherein the controller stops the second focus control and drives the focus adjusting member to return to a position at which the sharpness signal is at the peak when the reduction in the sharpness signal after exceeding the peak value thereof is found during the second focus control.

5. The image-pickup apparatus according to claim 2, wherein the controller changes a driving speed of the focus adjusting member depending on the stages when the predetermined change is not found in the sharpness signal during the second focus control.

6. The image-pickup apparatus according to claim 4, wherein the controller changes a driving speed of the focus adjusting member from a first speed, to a second speed higher than the first speed, and then to a third speed lower than the second speed, from the driving start stage to the driving end stage of the focus adjusting member.

7. The image-pickup apparatus according to claim 2, wherein the controller sets the plurality of stages based on at least one of a position of the focus adjusting member, a driving time period, and a focal depth of an image-pickup optical system.

8. An image-pickup apparatus comprising:
   an image-pickup element photoelectrically converting into signal from an object image; and
   a controller performing first focus control of controlling drive of a focus adjusting member based on a sharpness signal representing a contrast state of a video signal produced with the image-pickup element and second focus control of controlling drive of the focus adjusting member based on a signal in accordance with a phase difference between a pair of object images,
   wherein the controller, in response to a predetermined change found in the sharpness signal during the second focus control, stops the second focus control and vibrates the focus adjust member with producing the sharpness signal in the first focus control.

9. The image-pickup apparatus according to claim 8, wherein the controller divides a driving period of the focus adjusting member from start to end in the second focus control into a plurality of stages and varies the predetermined change depending on the stages.

10. The image-pickup apparatus according to claim 9, wherein the controller switches the predetermined change from a reduction in the sharpness signal, to a reduction in the sharpness signal after exceeding a peak value thereof, from a driving start stage to a driving end stage of the focus adjusting member.

11. The image-pickup apparatus according to claim 10, wherein the controller stops the second focus control and drives the focus adjusting member to return to a position at which the sharpness signal is at the peak when the reduction in the sharpness signal after exceeding the peak value thereof is found during the second focus control.

12. The image-pickup apparatus according to claim 9, wherein the controller changes a driving speed of the focus adjusting member depending on the stages when the predetermined change is not found in the sharpness signal during the second focus control.

13. The image-pickup apparatus according to claim 11, wherein the controller changes a driving speed of the focus adjusting member from a first speed, to a second speed higher than the first speed, and then to a third speed lower than the second speed, from the driving start stage to the driving end stage of the focus adjusting member.

14. The image-pickup apparatus according to claim 9, wherein the controller sets the plurality of stages based on at least one of a position of the focus adjusting member, a driving time period, and a focal depth of an image-pickup optical system.

15. The image-pickup apparatus according to claim 8, wherein the controller, in response to a predetermined change found in the sharpness signal during the second focus control, vibrates the focus adjust member to detect a direction of in-focus position being.

16. A method of controlling an image-pickup apparatus including an image-pickup element that photoelectrically converts an object image and a light-receiving sensor that outputs a signal in accordance with a phase difference between a pair of object images, the method comprising the steps of:
   performing first focus control of controlling drive of a focus adjusting member based on a sharpness signal representing a contrast state of a video signal produced with the image-pickup element;

performing second focus control of controlling drive of the focus adjusting member based on the signal in accordance with the phase difference; and stopping the second focus control or switching focus control from the second focus control to the first focus control in response to a predetermined change found in the sharpness signal during the second focus control.

17. A method of controlling an image-pickup apparatus including an image-pickup element that photoelectrically converts an object image and a light-receiving sensor that outputs a signal in accordance with a phase difference between a pair of object images, the method comprising the steps of:

performing first focus control of controlling drive of a focus adjusting member based on a sharpness signal representing a contrast state of a video signal produced with the image-pickup element;

performing second focus control of controlling drive of the focus adjusting member based on the signal in accordance with the phase difference; and in response to a predetermined change found in the sharpness signal during the second focus control, stopping the second focus control and vibrating the focus adjust member with producing the sharpness signal in the first focus control.

* * * * *